United States Patent [19]

Eugenio

[11] Patent Number: 4,926,284

[45] Date of Patent: May 15, 1990

[54] LIGHTNING PROTECTION DEVICE FOR INTERACTING WITH LEADER STROKE TO PREVENT RETURN STROKE

[75] Inventor: Manghi Eugenio, Varese, Italy

[73] Assignee: ISPE S.a.s. di Erminio GIANA e C., Busto Arsizio, Italy

[21] Appl. No.: 714,684

[22] Filed: Mar. 21, 1985

[51] Int. Cl.⁵ ............................................. H02H 3/22
[52] U.S. Cl. ..................................... 361/117; 361/126
[58] Field of Search ............... 361/117, 118, 126, 119, 361/127, 91, 111; 174/3

[56] References Cited

U.S. PATENT DOCUMENTS

| | | | |
|---|---|---|---|
| 623,033 | 4/1899 | Raunacher | 361/117 X |
| 911,260 | 2/1909 | Pennock | 174/3 |
| 3,863,111 | 1/1975 | Martzloff | 361/119 |
| 4,016,462 | 4/1977 | Pavliny | 361/117 |
| 4,035,693 | 7/1977 | Luxa et al. | 361/127 X |
| 4,227,229 | 10/1980 | Imataki | 361/117 |
| 4,233,641 | 11/1980 | Baumbach | 361/119 |
| 4,326,233 | 4/1982 | Yanabu et al. | 361/127 |
| 4,463,404 | 7/1984 | Hassan | 361/117 X |

*Primary Examiner*—William M. Shoop, Jr.
*Assistant Examiner*—Anthony Wysocki
*Attorney, Agent, or Firm*—McGlew & Tuttle

[57] ABSTRACT

An atmospheric electrode is charged by electrostatic induction from a leader stroke which is associated with lightning formation. The electrode is earthed through a varistor which becomes conductive when the value of the tension associated to the electric field at ground exceeds a pre-determined value. In this way, a destructive return stroke, which usually follows a leader stroke during lightning formation, is avoided.

3 Claims, 2 Drawing Sheets

LIGHTNING PROTECTION DEVICE FOR INTERACTING WITH LEADER STROKE TO PREVENT RETURN STROKE

FIELD AND BACKGROUND OF THE INVENTION

This invention provides a lightning protection device for structures, civil and industrial buildings, plants or the like. It includes an atmospheric electrode which is insulated from the ground and means suitable for earthing or grounding the electrode when the potential difference, which is associated with the electric field at ground, exceeds a pre-determined value.

The inventive device develops a preventive action by interacting during the downward phase of the discharge. Therefore, it can stop the advancing and development of the discharge and avoid the formation of return strokes, which is the most dangerous effect of lightning.

First of all, it is opportune to summarize the phenomena which lead to the formation of lightning. These phenomena are not yet fully explained. During storms we have inside the clouds, the formation of a storm nucleus characterized by a greater concentration of electric charges, generally positive in the upper layers and negative in the lower zones, at a distance from ground of about 2-4 km.

Therefore, between the earth's surface and clouds a strong electric field is produced. The potential difference can reach 100,000,000 volts.

When the potential difference succeeds in overcoming the dielectric resistence of air, lighting is produced, generally beginning with a leader stroke which moves in zig-zagging fashion toward the earth and carries a high quantity of current.

During the final downward phase the electric field at ground reaches such high values that a certain quantity of opposite sign charges (streamer) leaves the ground to meet the downward stroke. A conductive channel is thus produced through which the leader stroke charges are scattered to ground. A violent return stroke then occurs with development of heat and luminous energy. This is the most dangerous effect of lightning.

The described phenomena are widely illustrated in several scientific publications. See in particular:

M. A. Uman "Lightning" Mc Graw-Hill (1969).
R. H. Golde (Edited) "Lightning: Physics of Lightning and Lightning Protection" Academic Press (1977).
J. A. Chalmers "Atmospheric Electricy" Pergamon Press, Oxford (1967).
H. Baatz "Überspannungen in Energieversorgungsnetzen" Springer-Verlag (1956).
T. Suzuki, F. Miyake, I. Kishizima "Study on experimental simulation of lightning strokes" IEEE-PAS April 1981.

The presently employed devices for lightning protection include one or more catching elements which are connected to earth by means of an opportunely sized conductor so as to constitute a preferential way for the strokes to be scattered at ground. These catching elements generally consist of pointed metallic rods or catching nets which are fixed to the upper part of the structures to be protected and connected to buried earth elements.

Such lightning rods present however several disadvantages: In the first place they offer a limited protection because they are not capable of bearing strokes of greater intensity than that for which they have been fitted.

Moreover, they are expensive because of their particular connection to earth, and require periodical maintenance.

More recently, some experiments were made with lightning rods provided with radioactive points in order to make the lightning rods more efficient. The hoped for results, however have not been obtained in this case either. Moreover, radio-active points can represent a danger to the extent that they have been forbidden in some countries.

The Italian Patent No. 767,809 in the name of De Bernardi describes means to protect TV antennas from lightning. To this end circular shielding elements are provided near the antenna dipole, to form a barrier in the vicinity to the parts most exposed to the danger of strokes.

According to the teachings of such patent, the circular shielding elements deviate the lightning strokes and oppose their effects. In other publications by the same author reference is made to protection devices the aim of which is to disperse the stroke over a wide surface so as minimize the destroying effects thereof, or to the exploitation of the high frequency electromagnetic fields to produce a shielding barrier which can deviate the lightning. However, no relevant teachings are given, nor arguments are brought in support of these theories and the working of the relative devices is not described either.

SUMMARY OF THE INVENTION

In any case the devices known at present have the aim of driving the lightning into a preferential path, or to disperse it over a wide surface. On the contrary, the device according to the present invention prevents the evolution of the lightning flash by acting on the leader stroke while the leader stroke is approaching the ground.

To this end, the device according to the invention works to favour the detaching from the ground, during one or more stages, of electric charges, which converge toward the leader stroke front, thus annulling the same.

BRIEF DESCRIPTION OF THE DRAWINGS

This invention is now described in detail, by way of a non limiting example, with particular reference to the enclosed figures, wherein.

Figure 3:
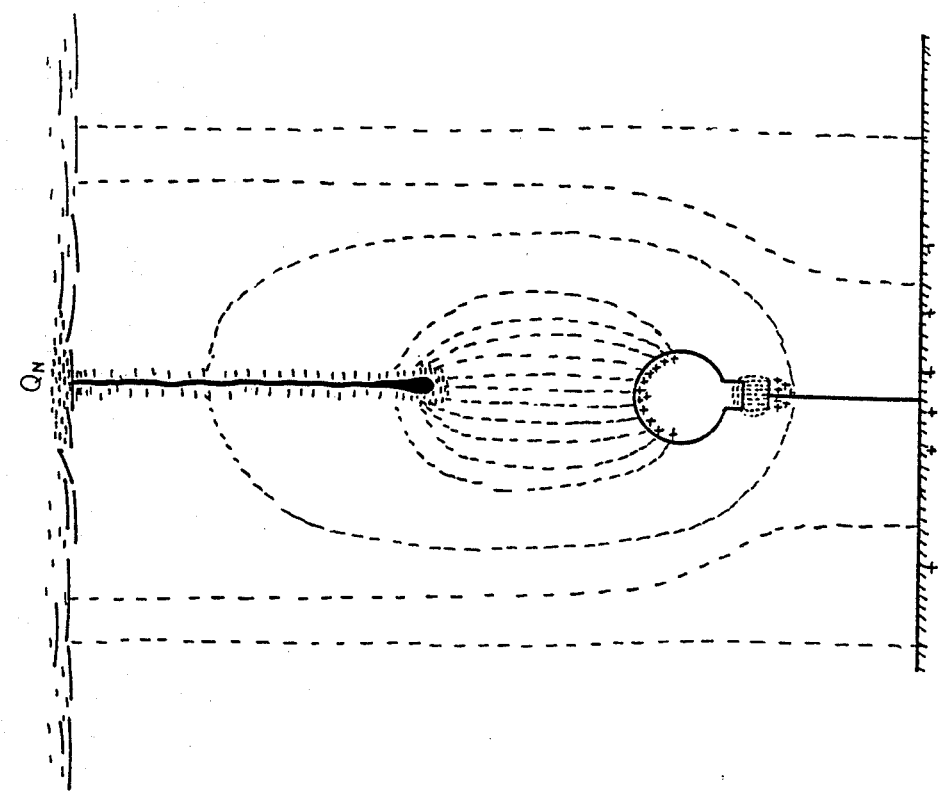
FIG. 3 schematically shows the interaction between the leader stroke and the device.
Figure 1:
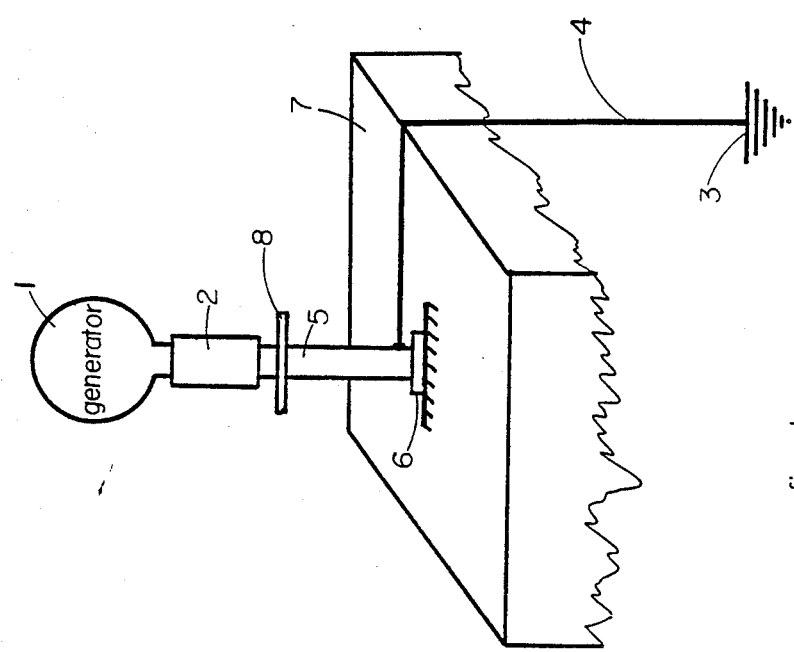
FIG. 1 schematically shows a device according to the invention.

FIGS. from 4 to 8 schematically show the different operative phases of the device in respect to a leader stroke.

DESCRIPTION OF THE PREFERRED EMBODIMENT

The device according to the invention consists substantially of a metallic atmospheric electrode 1 which is connected to the upper pole of a varistor arrester 2, whose opposite pole is connected to an earth electrode 3 by means of a conductor 4. Electrode 1 has a dome-shaped or spherical top area.

The electrode-varistor unit is mounted on a support 5 which is provided with an insulated base 6, fixed at the upper part to the structure 7 to be protected.

Near the lower part of the varistor 2 an electrostatic shield 8, which consists, for instance, of a metallic ring or the like, is present.

The electrode 1, which will preferably have a wide radius roundish shape, could be made for instance of aluminium.

The varistor 2 will preferably be of the zinc-oxide type. Such varistors are now used for different applications, in particular to protect electric lines from overvoltages.

The dimensions of the conductor 4 are considerably smaller than those of the condustors employed for traditional lightning rods. In fact, as they have to conduct low currents (as will be explained herein after) it is sufficient that its section be of about 1/5-⅛ that of the usual earth conductors.

Figure 2:
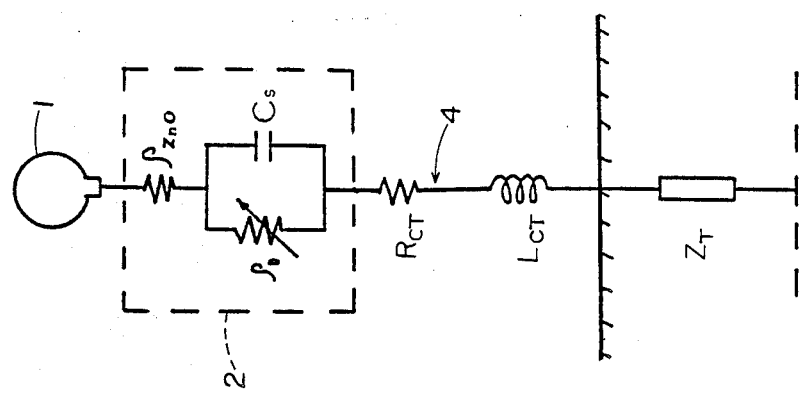
FIG. 2 shows the equivalent circuit for the device according to the invention.

FIG. 2 shows the equivalent circuit of the device according to the invention, where: $\rho_0$ is the resistivity of the layers produced by the poisoning elements ($\simeq 10^{10} \neq \Omega \cdot cm.$), being a non-linear function of the electric filed intensity;

$P_{zn0}$ is the zinc resistivity ($\simeq 1\Omega \cdot cm.$);

Cs—is the equivlaent capacitance of the varistor (10−100 $\mu F$);

Rct—is the equivalent resistance of the earthing conductor;

Lct—is the equivalent inductance of the earthing conductor; and

Zt—is the equivalent earth impedance.

For a better understanding of the invention, there will now be provided a detailed explanation of the working thereof during its different phases and of the phisical principles on which it is based.

Further we will call:

Ke—the electric field intensity near the electrode;

Ks—the electric field intensity between the varistor poles;

Kc—the electric field value corresponding to the conduction state of the varistor; and Kcs—the critical value of the electric field for the formation of upward strokes.

The gathering of electric charges $Q_n$ (FIG. 3) in the lower part of the cloud induces, between the cloud and the earth, an electric field where the device is present.

FIG. 3 shows the outline of the lines of force of said electric field. A concentration of elelctric charges develops on the electrode 1, which is a function of the electrode radius and of the electric field at ground.

When the potential difference between the cloud and the ground reaches a value capable of overcoming the dielectric resistance of the air, the formation of a downward leader stroke (in particular toward the electrode 1) occurs.

The overall electric charge of the leader stroke is about 5 C (according to indirect measurement), distributed with a density of about 0.5 mc/ml.

As the downward stroke gets nearer, it causes the separation of the charges present in the electrode; These charges concentrate in the upper or lower part of the electrode according to the sign. The varistor 2 is fit to operate and to become conductive when the electric field value is slightly lower than the critical value (3 to 5 KV/cm) at which the formation of upward streamers from the earth structures occurs. Therefore, when Ks<Kc the atompspehric electrode can be considered as electrically insulated from the earth.

Figure 4:
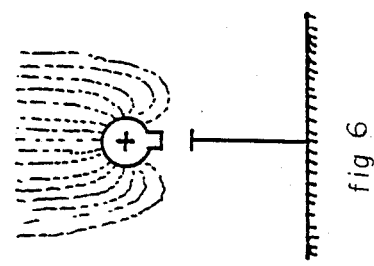

The electrode acts as a metallic body, insulated and with null total charge, immersed in an electric field. Consequently, electric charges of opposite sign concentrate in the upper and lower part of the electrode, by electrostatic induction (FIG. 4).

Figure 5:
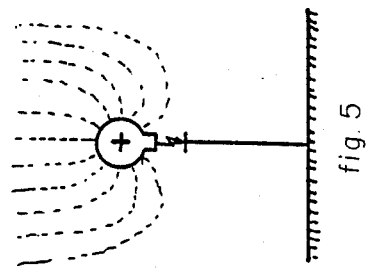

When Ks exceeds the critical value Kc (because a leader stroke gets near the protected structure), the varistor becomes a conductor and the electrode becomes totally positive with further intensification of Ke (FIG. 5). During this phase a current flows through the arrester, allowing a net transfer of charges from the ground to the atmospheric electrode.

Note that the current passing through the earth conductor is lower than the first return stroke of the lightning. This is due to the lower associated charge.

The electric charge on the atmospheric electrode acts as a shield for the underlying part of the apparatus and annuls the electric field inside the arrester.

Figure 6:
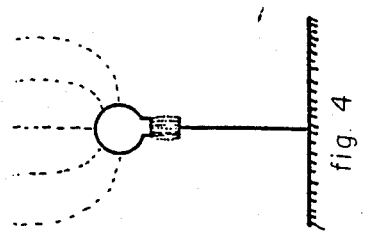
Figure 7:
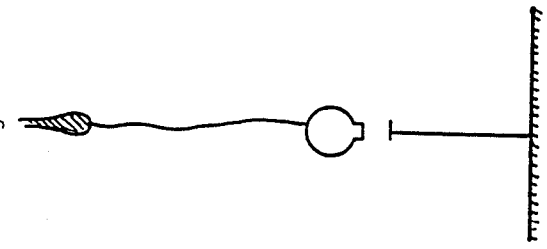
Figure 8:
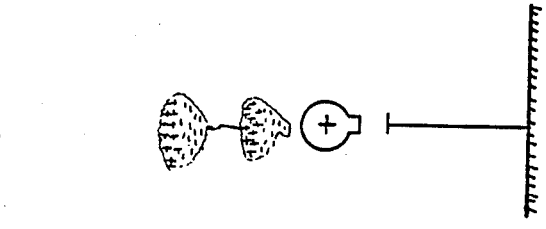

Therefore, the varistor passes to the interdiction state again (FIG. 6). The electric field Ke increases further and comes near the Kcs value, because of the leader stroke getting always nearer to it.

In the vicinity to the atmospheric electrode the electric field conditions become such as to produce a process of 'corona' discharges. The discharges move toward the downward leader stroke of opposite sign (Ke≧Kcs).

Therefore, a correspondent quantity of charge is annulled in the leader stroke without the upward flux of charge affecting the whole of the apparatuses underlying the atmospheric electrode. During this last phase the Ks value increases again.

After each working the apparatus is restored to the initial conditions and is ready for another working; this is important when the quantity of charge transferred to the downward leader stroke is not enough to annul it completely and to stop its advancing toward the protected structure.

However, the apparatus can never represent a preferential path for the leader stroke—because the atmospheric electrode—earth connection is off.

The use of an atmospheric electrode with a wide radius of curvature allows a considerable charge storage before 'corona effluvium' phenomena or micro-discharges occur. The electric field increase near the electrode is caused by the variation in the induced charge density. As the high-value field area is wide, charges leaving the electrode can cover a great distance before being confined in areas where the field intensity corresponds to a stasis condition.

It should be noted that, thanks to the conduction characteristics of the varistor the polarity of the lower part of the stormy cloud—that is the leader stroke polarity—does not affect the protective efficiency of the device, but only the ways of production and spreading of the corona effluvium phenomena.

An expert in the art can provide for several changes and variations which should all fall—however—within the ambit of the present invention.

I claim:

1. A lightning protection device for satisfying the charge requirements of an initial downwardly travelling leader stroke of a lightning flash to avoid the formation of a subsequent upwardly travelling return stroke, comprising an atmospheric electrode having a dome-shaped top area with a selected radius, a varistor connected to said atmospheric electrode, said varistor being structured to become conductive at an electric field value on the atmospheric electrode which is slightly less than a critical value at which the return stroke of the lightning flash would be formed, a conductor connected to said varistor and an earth electrode connected to said conductor; said atmospheric electrode, said varistor, said conductor and said earth electrode being connected in series, said atmospheric electrode being made of conductive material with said selected radius being sufficiently large to permit storage of sufficient charge from the leader stroke before a corona effluvium phenomenon occurs from the atmospheric electrode, whereby the charge of the downwardly travelling leader stroke is satisfied by said varistor becoming conductive to avoid formation of the following return stroke of the lightning flash.

2. A device according to claim 1, including an insulator connected to said atmospheric electrode and varistor for supporting said atmospheric electrode and varistor and for isolating said atmospheric electrode and varistor from earth.

3. A device according to claim 2, including a disc-shaped electrostatic shield connected between said atmospheric electrode and said insulator for electrostatically shielding said atmospheric electrode from below.

* * * * *